March 2, 1954
C. F. WALSH
2,670,987
CONTROLLED POWER-OPERATED LATERALLY
MOVABLE TRUCK DRIVER'S SEAT
Filed Jan. 30, 1952
3 Sheets-Sheet 1
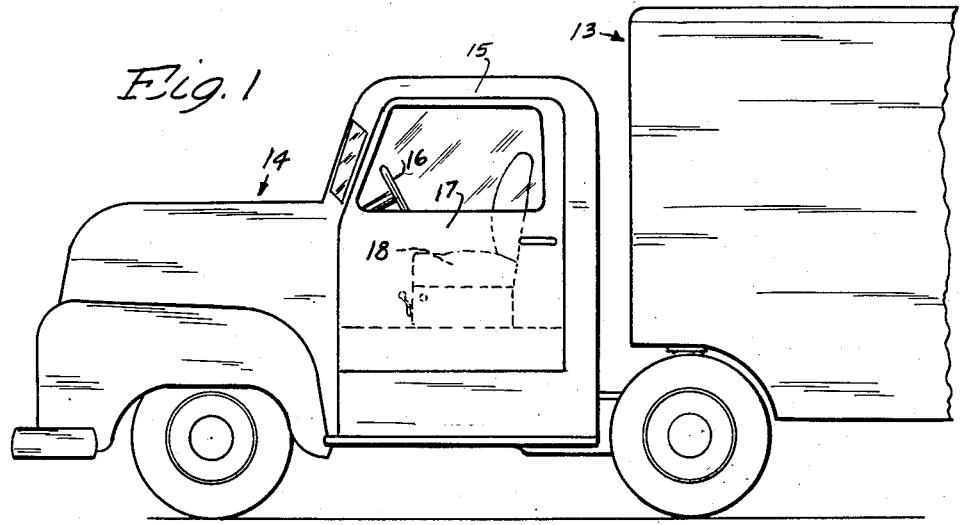
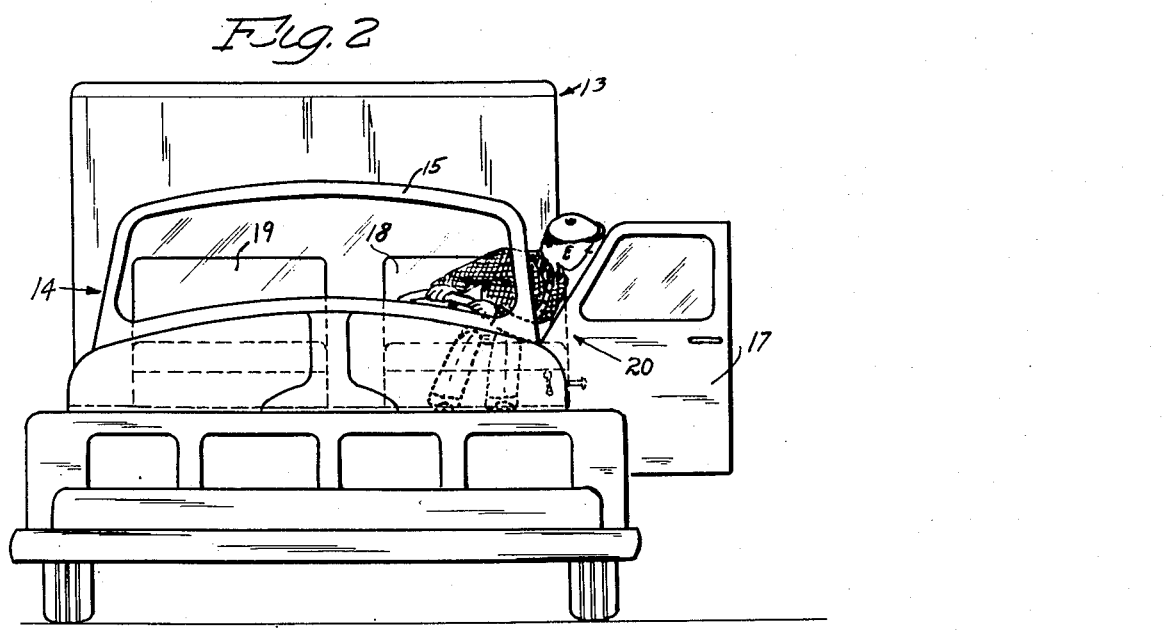
INVENTOR
CLARK F. WALSH
BY Whiteley and Caine
ATTORNEYS

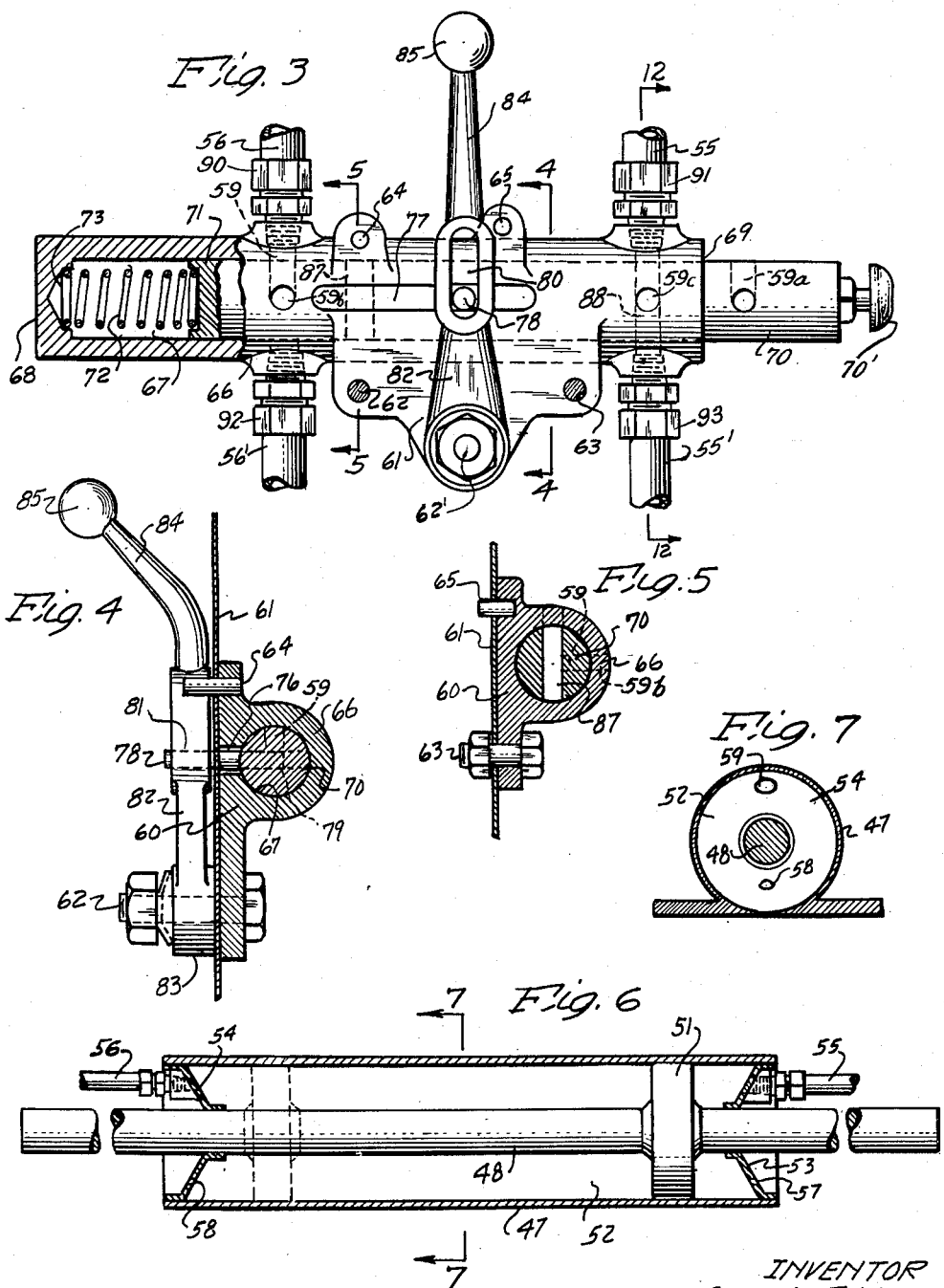

March 2, 1954
C. F. WALSH
2,670,987
CONTROLLED POWER-OPERATED LATERALLY
MOVABLE TRUCK DRIVER'S SEAT
Filed Jan. 30, 1952
3 Sheets-Sheet 3
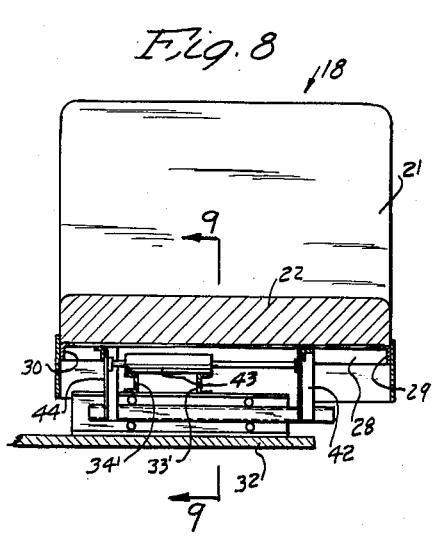
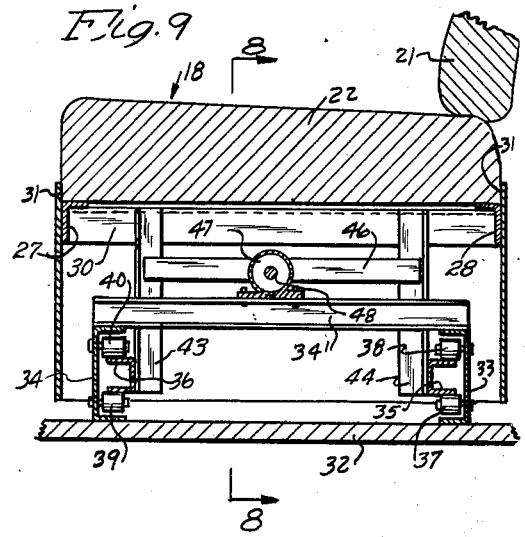
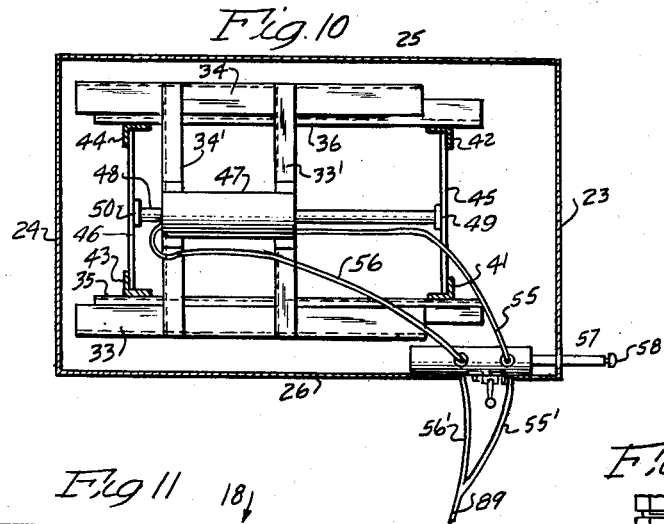
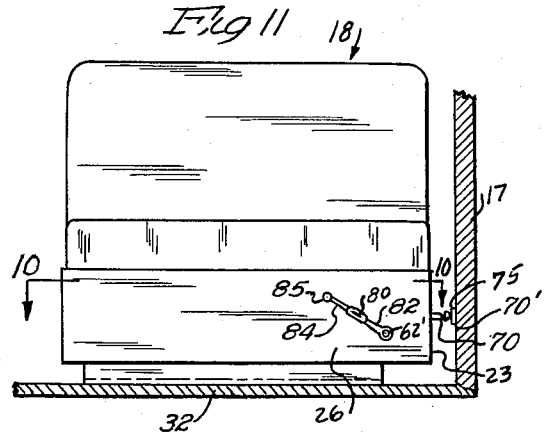
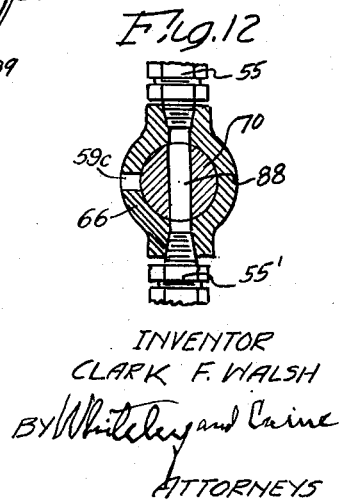
INVENTOR
CLARK F. WALSH
BY Whiteley and Caine
ATTORNEYS Patented Mar. 2, 1954

2,670,987

UNITED STATES PATENT OFFICE 2,670,987

CONTROLLED POWER-OPERATED LATERALLY MOVABLE TRUCK DRIVER'S SEAT

Clark F. Walsh, Nashua, Iowa

Application January 30, 1952, Serial No. 268,944

5 Claims. (Cl. 296—65)

My invention is concerned with a controlled laterally movable truck driver's seat in a truck or semi-trailer truck, wherein the cab is narrower than the cargo portion or trailer, and it is desirable to project the driver, while in a driving position, through an open doorway of the cab to enable him to properly see beyond the lateral limits of the cargo portion and control the vehicle while the latter is moving in a reverse direction.

In the case of trucks or semi-trailers, the cargo portion is always considerably wider than the cab of the truck or prime mover. During the normal forward movement of the vehicle the driver is unable to have direct rear vision because such is obstructed by the cargo body. A rear vision mirror which may project laterally from the cab can be used to indirectly observe conditions of the highway in rear of the truck or to indirectly observe vehicles which are overtaking or passing the truck, but the present invention is in no way concerned with this type of indirect rear vision. The problem which this invention is intended to solve is concerned when the driver is backing the truck to a loading dock or the like and requires direct vision of the path of movement. Because the cargo is generally loaded and unloaded through rear doors of the truck, it is essential to accurately control the reverse movement of the truck so as to bring the loading doors thereof in proper alignment with a loading dock or a doorway of a building through which the cargo will pass to and from the truck. Still further, at times it is necessary to back a truck into an alley or through a gateway or in close proximity to other parked trucks and in either condition it is essential that the driver be able to accurately view the rearward movement of the truck. For these purposes rear vision mirrors are of no value and it is a universal practice for the driver to open his cab door and lean outwardly to have rear vision, although it is frequently a practice for him to stand or partially stand on the running board of the cab with one foot and his arms within the cab to steer and control the motive power of the truck. This practice is extremely difficult and often dangerous for it must be borne in mind that the truck is in motion, and numerous accidents have occurred through the control of the truck in this manner, either by way of the driver falling from the cab or having the cab door caught in an obstruction.

I have discovered a way to remedy this very serious difficulty by having the driver's seat or a portion of it mounted for lateral sliding movement which when the door or the cab is open will carry the part of the seat upon which the driver sits to or near the edge of the truck or trailer body, whereby from his place on the seat which has been so moved the driver can turn his head backwardly and get a clear view of the ground and buildings at the side and behind the truck or trailer body and at the same time enable him to properly steer and control the movement of the truck.

I have discovered further that to permit such lateral movement out and back the seat must be supported to slide freely in a lateral direction, and there must be provided means such as pneumatic suction or pressure means or hydraulic pressure means for effecting such lateral movement under the control of the operator and in relation to the closing and opening of the door.

To that end I propose to mount rigidly connected to the motor vehicle framework and extending along the lateral direction of movement of the seat a cylinder having therein a piston, and extending through the cylinder and extending outside the ends thereof a piston rod, which piston rod will have its ends connected with the supporting means of the seat so when fluid, either suction or compressed air or compressed hydraulic fluid, is introduced in one end of the cylinder it will move the seat laterally in one direction and when such fluid is introduced in the other end of the cylinder it will move the cylinder back.

Any desired effective power application may be employed and be within the scope of my invention. The transmission of fluid power means is a practical and effective way of accomplishing the result sought, but I have found a preferred form of such fluid transmitting power means to be the application of suction air movement, which, as in the present invention, does not require great or excessive power. Gas or electric motors and connections to the truck gas engine also may be used.

Such an arrangement requires valve mechanism under the control of the operator for connecting the fluid from a source of supply to one side or the other of the piston and simultaneously disconnecting it from the reverse side or end of the piston. Associated with the valve and the movable seat is a member which projects beyond the lateral limits of the seat that is engageable by the door when the latter is moved to a closed position so that when the door is moved in the closing direction, said member is engaged and causes the valve to move to a position where the seat and driver are instantly moved under power within the cab to permit the door to properly close.

The purpose of the invention is not primarily to move the seat, but quickly and efficiently to move the seat and the driver while he is driving the motor vehicle to a position where he can see past the wider portion of the vehicle behind his so he can safely and effectively put such vehicle into position for receiving or discharging a load and thereafter return the seat and driver within the cab.

It is an object of my invention to provide in the cab of a motor vehicle which includes a truck or trailer of substantially greater width moved thereby, a seat for the driver, which may be a sectional part of the normal driver's seat, and which is mounted so as to slide readily in a lateral direction to take part of the seat through the doorway when the door has been opened to permit the operation, and to take the driver with it so he can see rearwardly past the front of the body of the truck or trailer and thereafter return the seat and driver to the cab.

It is a further object of my invention to provide means operated by pneumatic or hydraulic power to move the slidable seat with the driver thereon laterally to project it through the space of the open door and to return it to normal position.

It is a further object to provide in combination with the power operated means, a control member carried by the movable seat through the open doorway of the cab, which will be in a position for engagement by the door when the latter is closed, so that the seat and driver can be returned to the cab merely by closing the door.

The full objects and advantages of my invention will appear in connection with the detailed description thereof given in the accompanying specification and the novel features of the invention by which the aforesaid important and advantageous results are secured will be particularly pointed out in the claims.

In the drawings illustrating one form of my invention.

Fig. 1 is a side elevation view of a motor vehicle power means and the front end of an attached trailer.

Fig. 2 is a front elevation view of the same showing the seat moved laterally through the door opening with the driver thereon to a point from which the driver, who is shown to be occupying the seat and driving a trailer truck, has a rear view of the side of the trailer or truck body and of the ground along that side and surroundings.

Fig. 3 is a front elevation view of a valve mechanism including means for controlling fluid flow to and from the means for operating to move the seat and the driver thereon laterally.

Fig. 4 is a transverse sectional view taken on line 4—4 of Fig. 3.

Fig. 5 is a sectional transverse view taken on line 5—5 of Fig. 3.

Fig. 6 is a sectional view of the means for moving the seat laterally.

Fig. 7 is a sectional view taken on line 7—7 of Fig. 6.

Fig. 8 is a sectional elevation view taken on line 8—8 of Fig. 9.

Fig. 9 is a transverse sectional view taken on line 9—9 of Fig. 8.

Fig. 10 is a sectional plan view taken on line 10—10 of Fig. 11.

Fig. 11 is a front elevation view of the seat with the floor support and door in section.

Fig. 12 is a sectional elevation view taken on line 12—12 of Fig. 3.

As illustrated, Fig. 1 shows a trailer section 13 connected with a truck power section or prime mover 14, in which is mounted, but not shown, the customary gas motor and controlling mechanisms normally present in a motor driven device of that type.

The power section embodies a cab 15 with a windowed compartment enclosing the steering wheel 16 and other operating parts for the motor mechanism. A door 17 on the left side of the cab opens outwardly, normally to give entrance to and from the cab compartment, but in my invention having an important function independent of mere entrance and exit requirements. In common practice a seat positioned as shown in Fig. 1 extends across the chamber within the cab 15 and is adapted to seat the driver at the left and any other person, as a helper or even a passenger, at the right.

In the present form of my invention the seat may be a single seat but as shown it is formed of two portions 18 and 19, of which the portion 19 is rigidly connected in the cab chamber and the portion 18 is mounted for sliding movements laterally, when door 17 is open, as indicated at 20 in Fig. 2.

The mounting of seat section 18 is clearly shown in Figs. 8 and 9. The back 21 and seat part 22 are substantially standard except for the seat section being shorter and being mounted to move laterally. As shown in Figs. 8, 9, 10 and 11, a rectangular depending skirt formed of end walls 23 and 24 and front and rear walls 25 and 26 have secured to their upper portions, but below the upper edges thereof, angle irons 27 and 28 at the front and rear and angle irons 29 and 30 at the ends with lips 31 extending all the way around and forming a containing support for the seat part 22.

Rigidly secured to the floor 32 of cab portion 15 are a pair of channel beams 33 and 34 which have their flanges turned toward each other. Within the flanges of the channel beams 33 and 34 are other channel beams 35 and 36 set in parallel relation to channel beams 33 and 34 with their flanges underlying and overlying the respective flanges of the channel beams 33 and 34.

Mounted upon the inside of channel beam 33 are a pair of spaced rollers 37 and 38, and within channel beam 34 are similar rollers 39 and 40. As shown in Fig. 9, these rollers engage the flanges of channel irons 35 and 36.

The channels 35 and 36 as seen in Fig. 10, have rigidly secured thereto at one end upright angle iron members 41 and 42 and at the other end similar upright angle iron members 43 and 44. Upright angles 41 and 42 are connected by a horizontal bar 45 and upright angles 43 and 44 by a correspondingly horizontal bar 46, and uprights 41, 42, 43, 44, as shown in Fig. 9, are connected to seat frame members 27 and 28.

The united seat is therefore mounted to be supported upon the movable channels 35, 36 and roll laterally along the sets of rollers 37, 38 and 39, 40, independently of the rigidly mounted channels 33 and 34. Upon longitudinal channels 33' and 34', as shown in Fig. 10, is rigidly mounted a cylinder 47 which has extending through it a piston rod 48, which piston rod is connected at 49 with the bar 45 and is connected at its other end at 50 with the bar 46. This interior of cylinder 47 is shown on an enlarged scale and more in detail in Fig. 6, wherein it appears that within the cylinder 47 fast on piston rod 48 is a piston 51.

As there shown, the chamber 52 within cylinder 47 is closed by an inwardly turned closure wall 53 which closely surrounds the piston rod 48, the latter being adapted to slide through said closure. The other end of chamber 52 is closed by a similar inwardly turned closure wall 54, which likewise surrounds the piston rod 48. A tube 55 is adapted to conduct air, preferably by suction, from chamber 52 at the right hand side (as shown in Fig. 6) of piston 51 and a similar tube 56 is adapted to conduct air by suction from chamber 52 on the opposite side of piston 51.

It will be obvious that if it is desired to operate this arrangement hydraulically or with air under pressure, that can be done by connecting the pipes 55 and 56 with a source of supply of fluid under pressure. Other conventional power means carried by the prime mover, not shown, may be used to move the seat 18.

At the opposite ends of the cylinder 47 are a pair of bleeder openings 57 and 58 for either admitting atmospheric air into the cylinder on opposite sides of the piston, or for draining compressed air or other fluid from the cylinder, either to atmosphere or to a fluid supply. In normal practice, where suction pressure from the engine manifold is used as the source of power, the bleeders can be omitted and suitable means of admitting atmospheric air through the alternate conduits 55 and 56 would be provided, such as the angular passages 59, 59a, in the member 70 and the corresponding openings 59b and 59c in the casing 66, as seen in Fig. 6.

The valve arrangement which I employ is shown in Figs. 3, 4, 5 and 12. It comprises a casting 60 which is bolted to a supporting plate 61 by bolts 62 and 63 and pins 64, 65.

Casting 60 is provided with a semi-cylindrical extension member 66, which has a central bore 67 extending from its closed end 68 through the open end of the cylindrical opening, as indicated at 69.

Within the bore 67 is a cylindrical member 70 which has its inner end 71 contacted by a compression spring 72 within the closed end 73 of the bore 67 and which tends to move the cylindrical member 70 outwardly away from the closed end 73.

At its other end the cylindrical member 70 has an abutment or button 70' which is adapted to be engaged by plate 75 on door 17.

The semi-cylindrical member 66 is provided with an elongated slot 76 extending through its wall into the cylindrical opening 67. This slot is also carried through the plate 61, as indicated at 77 in Fig. 3.

A pin 78 extends through the slot 76 and is embedded in the cylindrical member 70. This pin extends through a transversely positioned slot 80 of a lever 84 which is pivoted on bolt 62 and has an outwardly extended handle provided with a hand hold ball extremity 85.

The cylindrical member 70 is solid throughout its length except for two parallel openings 87 and 88, as shown in dotted lines in Fig. 3 and in full lines in Fig. 5 as to opening 87, and in Fig. 12 as to opening 88.

From adapters 90 and 91, threadedly secured to member 66, the flexible tubes 55 and 56 extend to opposite ends of the cylinder 47. Adapters 92 and 93 also secured to member 66 connect with flexible tubes 55' and 56' which are joined at a junction 89. The junction 89 may be connected to the intake manifold, not shown, of the truck engine when vacuum is used as the source of power, or to an air compressor or hydraulic fluid system if the latter are used. In the event that a hydraulic fluid is used, return tubing would extend from the bleeder openings 57, 58 at the opposite ends of the cylinder back to a fluid reservoir.

The operation of the invention will now be explained. Initially it should be understood that this invention is applicable to commercial or cargo carrying vehicles in which the cargo carrying portion is of greater width than the cab portion, and that the invention is concerned with projecting and returning the driver on a safe and comfortable seat for a distance sufficient to enable him to properly steer the vehicle in reverse movement. The difference in width between the cab and the cargo body will differ with different makes of trucks, and therefore the extent of movement of the seat and driver may vary and can be controlled by the length of piston rod 48 and the range of movement of piston 51. However, the extent of movement of the seat should not be so great that the driver's feet are taken away from the usual control pedals. Therefore in the instance of the widest truck bodies, the extent of movement of the seat will be in the order of about one-half of the difference in width between the cab and the truck body, while in trucks having narrower bodies, the seat may be projected for a distance substantially equal to the difference in width of the cab and cargo portions of the truck.

Assuming now that the driver wishes to reverse his truck through a narrow passage, or to a loading dock, he sets the driving mechanism of the truck in reverse and then opens the cab door 17 because it is essential in steering the truck in reverse that he directly see the path through which his vehicle will move, and as explained heretofore, rear vision mirrors projecting laterally from the side of the cab are useless for this purpose. To be able to see along the side of the truck the driver moves the valve handle 84 to the right, as seen in Fig. 3, thereby bringing the passage 88 in register with adapters 91, 93 to permit the moving fluid, as for example suction pressure, to pass through the conduits 55, 55'. This action draws air from the right hand side of piston 51, as seen in Fig. 6, thereby creating a partial vacuum on the right hand side of the piston. Air is drawn into cylinder 47 through the conduit 56 through the opening 59 to move the piston 51 through the pressure differential. Movement of the piston to the right of the cylinder projects the seat 18 through the open door 17 for a distance sufficient to permit the driver to be able to see the area adjacent the left hand side of the truck and properly steer the back end of the truck to the loading dock. The seat may be retracted within the cab by moving lever 84 to the left, as seen in Fig. 3, but if during the period that the seat is in its extended position and the door 17 is still open, an obstruction appears which would likely cause collision with the door, the driver need merely pull the door inwardly in its closing position. In so moving the door engages the button 70', thereby moving member 70 to the left to bring the passage 87 in register with the conduits 56, 56'. This closes off passage 88 and opens passage 87, thereby causing the piston 51 and piston rod 48 to move to the left, as seen in Fig. 3, to draw the seat and the driver thereon back into the cab. In practice, the seat moves rapidly and is substantially instantly drawn into the cab and into its normal position. Therefore, the seat may be returned by the mere closing of door 17, which may be important under emergency conditions since the button 70 is always in a position to accomplish this action when the door is open and the seat is in its extended position.

From the above description the purpose and advantages of my invention will appear. As above pointed out, the primary purpose and the major advantage of the practice of my invention consists in moving the driver while he is in a driving position to a position through the open doorway of the cab where he can see past the wider truck or trailer, and at the same time having his feet and arms in a position to provide proper operation of the control elements of the motor truck. Merely to move the seat laterally for adjusting its position would be valueless. It is actually the moving of the driver into a position where he can see what he is doing in driving the truck in reverse which is important.

A further great advantage of my invention comes from the simple mounting of the seat which supports it upon four spaced freely rotating rollers, so that, even with the heavy weight of the driver added to that of the seat, very little power is required to move the driver into the position where he is partially outside of the cab.

I claim:

1. In a motor truck, in combination, a cargo body, a prime mover and driver's cab connected to the front end of the cargo body, said cab being substantially narrower in width than the cargo body, and having a lateral opening therein forming an entrance for the driver, a driver's seat, a telescopic support within the cab consisting of a pair of laterally extending tracks rigidly connected to the driver's seat, laterally extending guide means interconnected with the tracks and rigidly connected to the cab, said tracks being laterally movable with respect to said guide means and being of a length to project the driver's seat through the opening in the cab for a distance substantially equal to half the difference in width between the cab and the cargo body to support the driver in normal driving position at least partially outside of the cab for steering the truck in reverse movement, a driving member carried by the cab and operably connected to the second pair of tracks, and control means connected between a portion of the prime mover and the driving member for controlling the lateral movement of the driver's seat.

2. In a motor truck, in combination, a cargo body, an engine and driver's cab connected to the front end of the cargo body, said cab being substantially narrower in width than the cargo body and having a lateral opening therein forming an entrance for the driver, a door normally closing said opening, a driver's seat within the cab, a telescopic support within the cab consisting of a stationary member and a laterally movable member to which the seat is attached and which on movement projects the driver's seat in a lateral direction only through the opening in the cab for a substantial distance for supporting the driver in a normal position at least partially outside of the cab for steering the truck in reverse movement, a driving member carried by the cab and operably connected to the movable portion of the telescopic support, and manually operable control means connected to the driving member and projecting in the direction of the door for controlling the movement of the driver's seat in either direction relative to the opening in the cab.

3. Apparatus to assist in backing a motor vehicle having controls located in a forward cab portion which is of smaller transverse dimensions than a rearward cargo portion, comprising, in combination: a seat section for supporting the driver of said vehicle in a position convenient to the controls thereof and adjacent a doorway in said cab portion; means mounting said seat section adjacent said doorway for solely lateral movement between a normal extreme position, in which said seat section is wholly within said cab portion, and a second extreme position, in which said seat section is projected externally of said cab portion through said doorway, the range of said movement being of the same order as one-half the difference between the transverse dimensions of said cargo portion and said cab portion, reversible power means connected to said seat portion for causing said lateral movement; and control means connected to said power means and operable to determine the extent and direction of said movement, so that a driver supported by said seat section may be carried into a position in which he has a clean view of the space beside and to the rear of said cargo portion while remaining seated in stable relation to the controls of said vehicle.

4. In a motor truck, in combination, a cargo body, a prime mover and driver's cab connected to the front end of the cargo body, said cab being substantially narrower in width than the cargo body, and having a lateral opening therein forming an entrance for the driver, a driver's seat within the cab, a telescopic support within the cab consisting of a stationary member and a laterally movable member to which the seat is attached and which on movement projects the seat in a lateral direction only through the opening in the cab for a substantial distance for supporting the driver in a normal driving position at least partially outside of the cab for steering the truck in reverse movement, a cylinder supported by the stationary member of the telescopic support, a piston within said cylinder, a piston rod carried by the cylinder and operatively connected to the piston and the laterally movable member of the telescopic support, means forming a source of fluid pressure carried by the prime mover; and control means between the means forming the source of fluid pressure and the cylinder, which is under the direction of the driver for alternately applying fluid pressure on opposite sides of the piston to effect outward and return lateral movement of the seat with respect to the cab.

5. In a cargo transport vehicle, in combination, a prime mover including a driver's cab adapted for connection to the front end of a cargo body which is of substantially greater width than the driver's cab, said cab having a lateral opening therein forming an entrance for the driver, a door carried by the cab and normally closing said opening, a driver's seat within the cab, a telescopic support within the cab consisting of a stationary portion and a laterally movable portion supported on the stationary portion and to which the seat is attached, which on movement projects the seat in a lateral direction only through the opening in the cab for a substantial distance to support the driver in a normal driving position at least partially outside of the cab where he has a clear view of the space beside and to the rear end of the cargo portion while remaining seated in stable relation on the seat for steering and controlling the vehicle in reverse movement, a cylinder supported by the stationary portion of the telescopic support, a piston within the cylinder, a piston rod carried by the cylinder and operatively connected to the piston and the laterally movable portion of the telescopic support, means forming a source of pneumatic suction power carried by the prime mover, a two-position valve carried by the movable portion of the telescopic support and operatively connected between the means forming the source of suction power and the cylinder on opposite sides of the piston, and which when moved to one of its positions effects lateral movement of the seat through the opening in the cab when the door is in an open position with respect thereto, and a member operatively connected to the valve and projecting outwardly from the seat and which is adapted for engagement by the door when the latter is moved to its normally closed position for moving the valve to its other position to return the seat within the cab.

CLARK F. WALSH.

References Cited in the file of this patent

UNITED STATES PATENTS

| Number | Name | Date |
|---|---|---|
| 2,242,247 | Grant | May 20, 1941 |
| 2,297,176 | Thompson | Sept. 29, 1942 |
| 2,587,679 | Atkinson | Mar. 4, 1952 |

FOREIGN PATENTS

| Number | Country | Date |
|---|---|---|
| 173,345 | Switzerland | Feb. 16, 1935 |
| 835,345 | France | Sept. 19, 1938 |
| 982,564 | France | Jan. 31, 1951 |